INVENTOR
PAUL E. STUCKERT
BY
ATTORNEY

United States Patent Office 3,466,553
Patented Sept. 9, 1969

3,466,553
CONTROL CIRCUIT FOR A SAMPLING SYSTEM
Paul E. Stuckert, Katonah, N.Y., assignor to International Business Machines Corporation, Armonk, N.Y., a corporation of New York
Filed Jan. 13, 1967, Ser. No. 609,050
Int. Cl. H03k 17/02
U.S. Cl. 328—151  16 Claims

ABSTRACT OF THE DISCLOSURE

The present invention relates to an improved control system for use with waveform sampling apparatus. More specifically, it relates to such a system whereby the sampling frequency will be automatically changed with changes in the sampling system dot weighting controls. Although the present system has particular utility for use with sampling oscilloscopes, its utility is by no means limited to this particular apparatus as the benefits gained by the presently disclosed system are even more pronounced when, for example, an accurate A/D converter is used to develop an auxiliary output. Briefly, the invention comprises a counter control directly connected to the dot weighting control whereby the output of the counter will cause a greater or lesser number of samples to be taken at a particular point on a sampled waveform depending upon the setting of said dot weighting control. In the normal arrangement the larger the dot weighting (assuming a maximum of unity) the fewer the number of samples it is necessary to take. Conversely with lower dot weightings greater overall accuracy may normally be achieved. However in order to obtain an output closely approximating the instantaneous value of the incoming waveform, it is necessary to take a relatively large number of samples. The present system accomplishes this by providing direct interaction control between the dot weighting circuits and the sampling circuits as outlined above.

BACKGROUND OF THE INVENTION

There are many areas in the electronics industry where it is desirable and necessary to be able to view in detail the shape and magnitude of extremely high frequency electrical signals in the multimegacycle range and also to measure or monitor their instantaneous value. However the normal gain bandwidth limitations of most available amplifiers prevent the direct viewing or analysis of such signals. For example, low level signals having rise times in the fractional-nanosecond range are not capable of direct display on generally available apparatus. Accordingly sampling systems have been employed to display, measure and analyze such waveforms. These systems examine a small portion of a waveform, remember the amplitude of the examined portion for as long as desired, and present a display of the instantaneous amplitude as, for example, a dot on a CRT display. On a subsequent cycle of the incoming signal it samples the waveform again slightly later in time and presents a new portion of the display and by continuing such procedure ultimately shows the complete display in a segmented or reconstructed form. It is of course to be understood that such analysis is only practicable with recurrent signals.

Although such a sampling system has primary utility with an essentially recurrent signal set, it is obviously not necessary that the pulse shape or amplitude never change. However the ability of such a sampling system to accurately follow very rapid changes of pulse shapes i.e., fast rise times is a major problem.

While such sampling circuits have a wide variety of applications in the measuring, display and testing fields, a primary use is in that of the sampling oscilloscope wherein it is desired to display a reasonably accurate representation of a sequentially sampled pulse train on the face of a cathode ray tube. A common type of sampling system, especially as used with sampling oscilloscopes, is known as an error-sampled feedback system. Such a sampling system employs a memory therein which stores a voltage proportional to the last sampled point on the input signal. Such a system is sometimes referred to generally as a feedback sampling system with a ratchet memory. The operation of the sampling system and the role played by the memory is somewhat complex and is ancillary to the present invention and will not be described in detail here; however, for a detailed description of such operation reference may be made to the publication "Sampling Notes," published in 1964 by Tektronix, Inc., Beaverton, Oreg. Assuming that the output from the sampling system is to be applied to an oscilloscope, the display is blanked during the time of transition from the display of one sample to the display of the next sample. Thus, the result is a series of dots on the display screen.

One of the principal problems with such sampling systems and especially with sampling systems as utilized with sampling oscilloscopes is that of developing at the output an accurate representation of the instantaneous value of the input signal as soon as possible. As stated previously, the reason that sampling systems must be used in certain situations is that conventional amplifiers are unable to follow the rate of change of the incoming waveform because of the bandwidth or frequency response limitations of the signal amplifiers. In addition, with conventional sampling systems the error signal or voltage due to noise and other factors causes the output to inaccurately represent the input.

The dot weighting of a sampling system is best defined by the following formula:

$$D.W. = 1 - \left| \frac{E_{02} - e_0}{E_{02} - E_0} \right|$$

where $e_0$ = the output after the first sample taken in the transition from quiescent output voltage $E_{01}$ to quiescent output voltage $E_{02}$.
$E_{01}$ = the quiescent or steady output voltage from the memory system as a result of a number of samples on the output waveform.
$E_{02}$ = the same as $E_{01}$ except that it is the output voltage corresponding to a new input amplitude.

As the system dot weighting approaches unity the output signal approaches the desired magnitude after the first sample but the error increases. The error signal is due to a combination of sampling gate noises inherent in the system and input signal variations such as both time and amplitude jitter. As will be readily apparent, such noise or random error becomes an even greater problem as the sensitivity of the sampling system increases.

One partial solution to the problem of improving such sampling systems has been to utilize a "smoothing" control. The introduction of such smoothing reduces the overall system dot weighting. The dot weighting K may have a range from 0 to 1, but values of K of the order of 0.05 to 0.10 must be used if any significant "averaging" effect is to be obtained. However this technique has one serious disadvantage in that a very large number of samples must be taken before the output of the sampling circuit reaches a steady state.

For a more detailed description of dot weighting in a feedback sampling system reference is hereby made to copending application Ser. No. 565,518, filed July 15, 1966, of P. E. Stuckert, and the publication "Sampling Notes," copyrighted 1964 and published by Tektronix, Inc.

The actual timing of most prior art sampling systems comprises sensing the leading edge of the incoming pulse train which initiates a trigger which in turn initiates the fast ramp. This fast ramp forms one input to a comparator the other input to which comes from a staircase generator. When the value of the fast ramp equals the current value of the staircase generator output, an output pulse is produced by the comparator which initiates a sampling pulse and also indexes the staircase generator to its next higher level. Thus, as the staircase generator is indexed, the timing or sampling pulse occurs at a later time relative to the time base of the incoming waveform thus causing the waveform to be sampled at a slightly later point in time after each sampling cycle. Thus, in known prior art systems provision is made only for increasing the sampling rate which is done by increasing the frequency or number of steps of the staircase generator. However, in such prior art systems each successive sampling point is at a different time on the time base of the incoming sampled signal.

SUMMARY OF INVENTIVE CONCEPTS AND OBJECTS

It has now been discovered that a marked improvement in the stability and accuracy of such sampling systems may be achieved by providing controls therein which cause the incoming recurrent signal set to be selectively sampled a plurality of times at the same relative point of the incoming signal before the next point is sampled. It has further been discovered that further improvement in system operation can be obtained if means are provided for automatically changing the sampling rate or the number of times at said fixed points at which samples will be taken said rate being dependent upon the current setting of the system dot weighting control.

It is accordingly a primary object of the present invention to provide an improved sampling system for analyzing and displaying very high frequency recurrent signal sets.

It is a further object to provide such a system wherein means are provided for selectively sampling the same relative position on said signal set a plurality of times to allow the sampling circuit to come to a steady state before sampling the next relative position on the input signal set.

It is a further object of the invention to provide a means for automatically varying the number of samples that will be taken at the same relative position on an incoming signal set.

The objects of the present invention are accomplished in general by a sampling system for analyzing a recurrent input signal set, said system including means for selectively sampling said signal set at desired points along the time base of individual members of said set. The improvement of the present invention comprises setting said sampling controls so that one or more samples may be taken of individual members of said set at a fixed point along the time base of said member a plurality of times before the next relative position is sampled. Accordingly to a further broad aspect of the invention control means are provided for varying the number of samples taken at each sampling position in accordance with the overall dot weighting of the sampling system.

In the presently disclosed embodiment these effects are achieved by a special counter and a counter control which is tied in with the dot weighting control and in the preferred embodiment is mechanically linked thereto.

According to a still further aspect of the disclosed embodiment additional control circuitry is included with the counter control, whereby the output of the system amplifier may be fed to an analog to digital converter only after the last sample taken a particular sampling period. Means are further provided to prevent the sampling system from indexing to the next sampling point until the analog to digital converter has completed its conversion of a particular output signal from the preceding sampling period.

DRAWINGS

Figure 3:
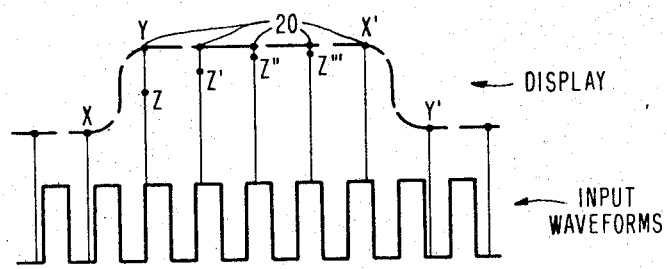

FIG. 3 comprises waveforms illustrating a conventional sampling system.

Figure 4:
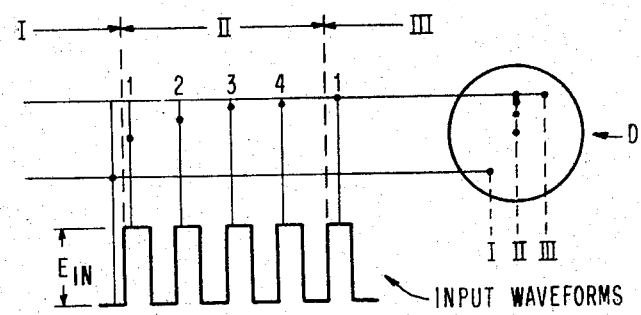

FIG. 4 comprises a set of waveforms illustrating the manner in which the sampling system of the present invention would operate and the development of the display that would appear on the face of a sampling oscilloscope in response thereto.

DESCRIPTION OF THE ILLUSTRATED EMBODIMENT

Figure 1:
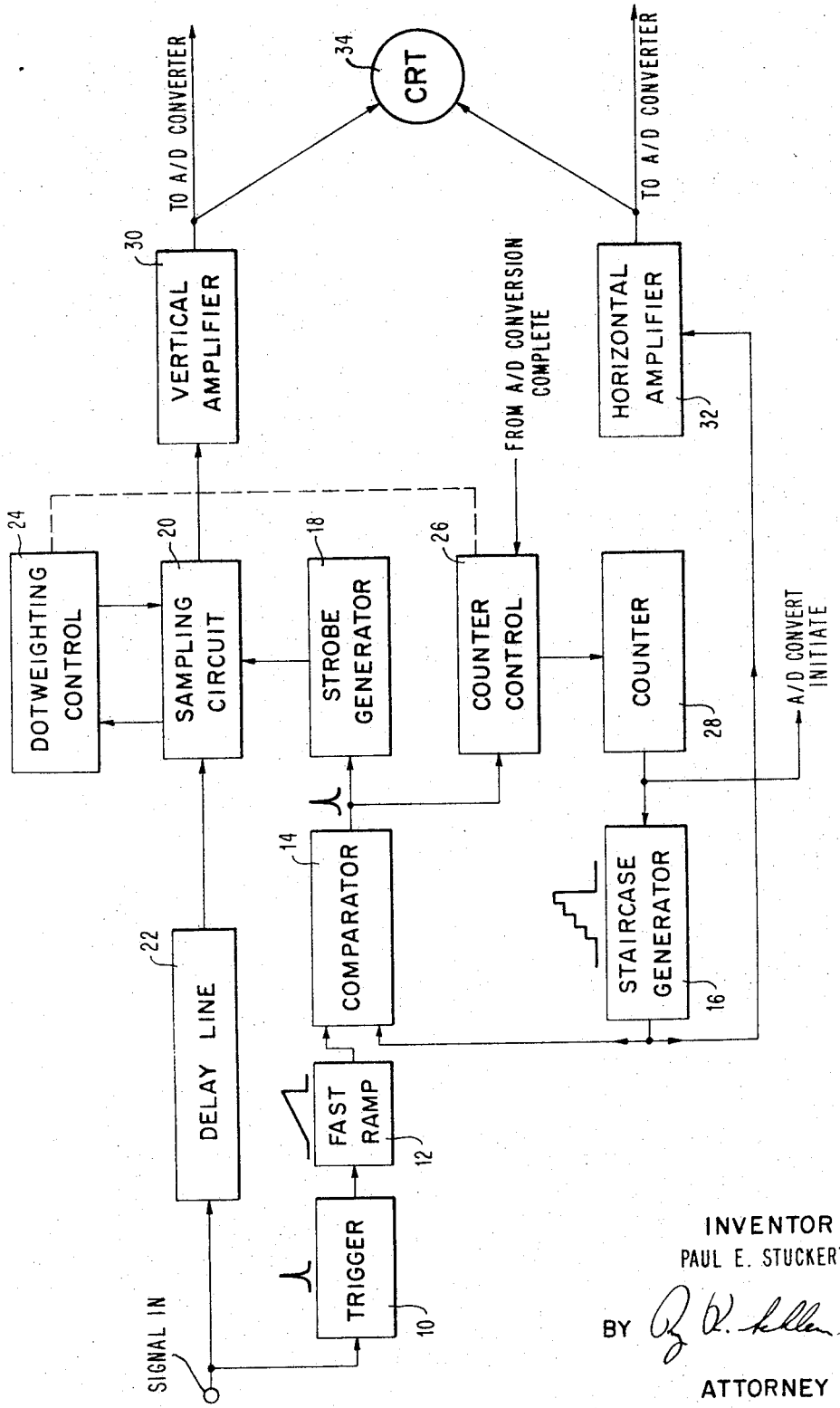
FIG. 1 is a functional block diagram of an improved sampling system particularly adapted for use with a sampling oscilloscope and showing a analog to digital (A/D) converter connections.

Referring now to the drawings, FIG. 1 comprises a functional block diagram of a sampling circuit incorporating the teachings of the present invention, said sampling circuit being specifically adapted for use with a display oscilloscope. However, to generally describe the operation of a prior art sampling system reference will be made briefly to FIG. 3 wherein it will be noted that the input waveforms, shown on the bottom of the figure, is illustrated as a recurrent set of pulses. The dotted line on the upper portion of the figure represents the reconstructed waveform formed by the dots 20 which dots appear on the face of the oscilloscope. It will be seen from this figure that each succesive sample is taken at a slightly later time with respect to the time base of the input waveform as indicated by the light vertical lines. Thus, with the waveforms illustrated in the figure nine samples or dots display a reconstructed version of the recurrent input signal. The display dots 20, shown along the dotted line, represent the display with a dot weighting of unity or 1.0. The dots displayed assuming a dot weighting of 0.5 would tend to approach an envelope including the dots $z$, $z'$, $z''$, $z'''$ wherein with each new sample taken the new $E_{out}$ is half of the difference between the current $E_{in}$ and the last signal stored in the memory. It may readily be seen that with such a low dot weighting a very poor approximation of a sampled wave is displayed assuming the illustrated number of samples, although less random noise error and distortion would be presented in the display. It should also be noted that the display of FIG. 3 is idealized from the standpoint of the sampling timing circuitry as in the case with most sampling systems it is the leading edge of an infinite input recurrent wave set which actually sets off the timing circuitry. Thus, in such a system the sampling would normally begin at the point which is the leading edge of the input pulse and would discontinue at some subsequent point depending upon the setting of the staircase generator pulse, etc. The prior art alleviates the distortion problem illustrated by the envelope formed by the $z$ dots taken at dot weightings considerably less than unity by greatly increasing the number of samples taken across an input pulse. Thus, for example, instead of taking 9 pulses as indicated, prior art systems might increase this to 50 or 100 samples in order to obtain a reasonably accurate representation of an input signal with a fast rise time.

The system of the present invention, instead of sampling an input signal set once at each successive point along its time base, proposes that a plurality of samples be taken at each point along the time base so that a more accurate output is obtained before the next point along the time base be sampled.

FIG. 4 explains the operation of an improved sampling system as utilized in the present invention. In this figure it will be noted at the top of the figure that I, II, and III refer to three different sample points wherein only the sampling represented by the II is shown completely. According to this concept, it will be noted that all of the samples of the incoming signal set or waveform are taken at the same place on the signal time base during a particular sampling period and this sampling position is stepped relative to both the sampling period I and sampling period III. The manner in which these samples are developed is indicated in the circled area labelled "Display" in the figure wherein the series of dots is respectively numbered I, II, and III. It will be noted that the dots denoted by the II represent the result of a series of samples taken where there was a considerable change in the input signal as indicated on the drawing between the last sample taken during the time period I and the instantaneous value of the input waveform during period II. In this figure all of the dots representing samples taken during time period II are shown in the display. However, in all probability, only the last sample taken, i.e., that of sample 4 would be actually displayed. This may be easily done with the present invention by unblanking the oscilloscope beam with the output of the counter as will be explained subsequently.

The example illustrated in FIG. 4 utilizes a dot weighting of 0.5 which from the table appearing subsequently in the specification would require four samples to be taken before the next point on the input signal were sampled. Thus with a dot weighting of 0.5 four separate samples would be taken at each point on the waveform although four complete samples are only illustrated during the time period II. It will readily be seen that assuming a system where only the last sample is displayed that the "Display" of the present system illustrated in FIG. 4 will much more closely approximate the input waveform than the "Display" of the prior art systems of FIG. 3 assuming, of course, a dot weighting of 0.5. It will be noted that in the sampling period III the difference between the signal at the sampling point 4 which is the last sampling point of period II and the first sampling point in sampling period III is negligible. This series of dots appears as essentially a single dot on the display.

As stated previously, the present invention recognizes the fact that at lower dot weighting values it is necessary for more samples to be taken in orer to have the final sample represent a close approximation of the true value of the input waveform. Additionally, it recognizes that there are situations where extreme accuracy is either not required or for other reasons it is acceptable to utilize higher dot weighting values with an acceptance of the fact that certain amount of distortion will occur. Thus, with the dot weighting of unity or 1.0 it would serve no purpose to take more than one sample whereas if the dot weighting is 0.25 as many as 16 samples might be desired. The present embodiment as set forth in FIGS. 1 and 2 utilize these figures for illustrative purposes as will be explained more fully subsequently.

Referring again to FIG. 1 which comprises the functional block diagram of the overall sampling system, it will be noted that an incoming signal set is applied to the terminal denoted "Signal In." This signal is fed to a trigger 10 which produces a pulse upon detecting the leading edge of an input signal. The output of this trigger initiates a fast ramp generator 12 which produces a sawtooth wave which is in turn fed to the comparator 14 wherein the instantaneous magnitude of the output of the fast ramp 12 is compared with the output of the staircase generator 16. The output of the staircase generator may instantaneously be any one of the indicated voltage levels on its waveform shown just above the block labelled "Staircase Generator" on the figure. When the magnitude of the saw tooth waveform from block 12 equals the magnitude of the current step of the output of the staircase generator a pulse is produced by the comparator 14. This output is fed to the strobe generator 18 which is conventional in such systems and produces a very precisely shaped pulse which is fed to the sampling circuit 20 which may for example be a balanced diode gate circuit as is well known in the art. It will be noted that delay line 22 is inserted between the "signal input" point and the input to the sampling circuit 20. This is because a certain amount of time is necessary for the trigger to energize the fast ramp and for the comparator to function and produce its output. The delay line 22 is chosen to be of such a length in terms of delay that the leading edge of the input pulse will reach the sampling circuit 20 at approximately the same time the strobe generator produces a sampling pulse in response to the lowest level of the output of the staircase generator 16.

In prior art sampling systems of this type the output of the comparator 14 is fed directly to the input of the staircase generator 16 whereupon each time a pulse is produced by said comparator it initiates or indexes the staircase generator to the next level or step in its output waveform, thus in effect advancing the sampling point along the time base of the input signal.

As will be seen by examining the formula presented earlier in the specification dot weighting in such a sampling system is not easily definable in words, however, the following Table I illustrates numerically the relationship between the input to the sampling circuit (A+B) and the output from the vertical amplifier ($a+b$) assuming an overal gain of 10 for different dot weighting K values. It will of course be appreciated that A and B ($a$ and $b$) are two successive samples.

TABLE I

| | K | |
|---|---|---|
| $A=0.1$ $B=0.2$ | 1 | $a=1.0$ $b=2.0$ |
| $A=0.1$ $B=0.2$ | .75 | $a_1=1.0$ $b_1=1.75$ |
| $A=0.1$ $B=0.2$ | .50 | $a_2=1.0$ $b_2=1.5$ |
| $A=0.1$ $B=0.2$ | .25 | $a_3=1.0$ $b_3=1.25$ |

Figure 2:
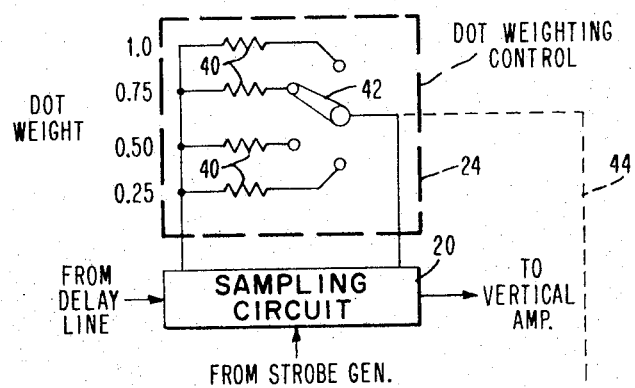
FIG. 2 is a logical schematic diagram of the dot weighting control, counter control, and counter per se as would be used in the system of FIG. 1.
Figure 2:
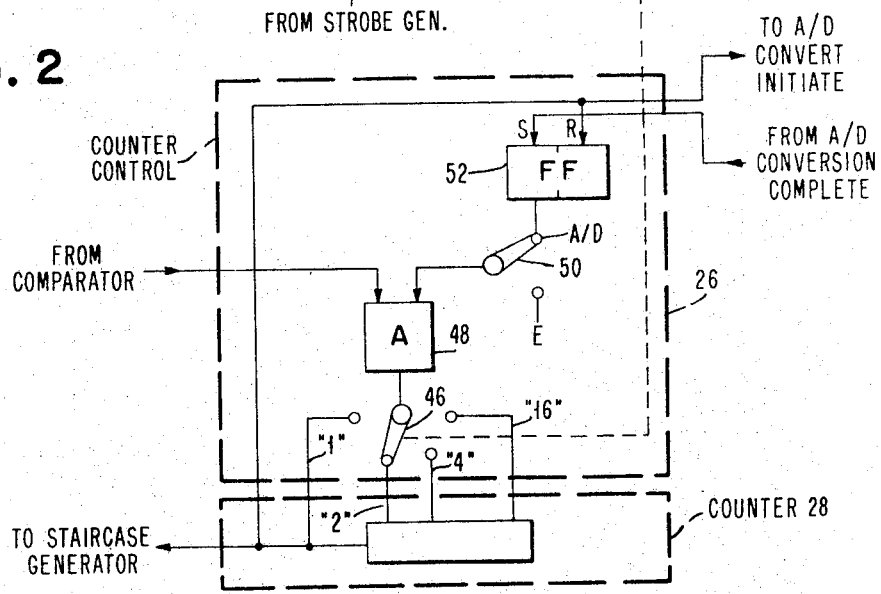

It may be seen that the dot weighting control for such a system may be described as a series of resistances which may be switched in or out of the sampling circuit to vary the effective gain thereof. Referring to FIG. 2 these resistances are shown in the upper portion of FIG. 2 as the series of resistors 40 which together with the selector switch 42 may be utilized to vary the dot weighting of sampling circuit 20. Thus the dot weighting control 24 is a relatively conventional control in a standard sampling circuit where an output pulse from the comparator is fed directly to the staircase generator.

However, with the present system it will be noted that the dotted line 44 indicates a direct mechanical connection between the dot weighting control switch 42 and the switch 46 located in the counter control 26.

It will be further noted that the inputs labelled "1," "2," "4" and "16" represent the input to the counter 28 and depending upon the input line receiving pulses from the comparator, an output pulse will be produced by the counter and fed to the staircase generator when the appropriate number of pulses, i.e., 1, 2, 4 or 16 are fed to said counter 28 from the comparator.

The following table represents an arbitrary example in which it is assumed that the indicated number of samples taken with different dot weightings will produce satisfactory results.

Table II

| Dot weighting: | No. of samples required |
|---|---|
| 1.0 | 1 |
| 0.75 | 2 |
| 0.50 | 4 |
| 0.25 | 16 |

It will be appreciated that the counter 28 could be chosen so that depending upon the various switch positions or input lines used any of a large number of input pulses could be chosen to produce a single output pulse. Similarly, a greater or lesser number of dot weighting settings might be provided depending upon the flexibility desired for this system.

Assuming now that the AND gate 48 on FIG. 2 has one line continually energized by virtue of the switch 50 being connected to the voltage source E and every time a pulse is received from the comparator it will pass through the AND gate 48 through the switch 46 and into the appropriate input line depending upon the setting of said switch whereby the pulses will be sequentially applied to the counter 28 so that every time an output pulse is received from the counter 28 the staircase generator 16 will be advanced. It is apparent that, assuming the dot weighting control 24 is set to 0.5 and the switch 46 in the counter control 28 set to the "4" input point of the counter 28, that every time four successive pulses are received from the comparator 14 that an output pulse will be produced by said counter and applied to the staircase generator. The specific example shown in FIG. 4 indicates such a setting wherein the specific dots during the time period II illustrate the increase in magnitude of the output of the sampling system and thus the vertical amplifier from the halfway point between the lowest and highest value of the input pulse to a point very closely approximating the final value of this output at the end of sampling period II which occurs after the fourth sample is taken. Further, after the fourth sample is taken during period II the counter 28 would produce an output pulse stepping the staircase generator to the next point of its output waveform which causes the system to enter sampling period III during which period four more samples would be taken and the system would then automatically advance into the next sampling period.

Thus, by changing the setting of the dot weighting control 24 the input to the counter 28 is automatically changed and thus instead of, for example, one pulse being supplied directly from the comparator to the AND circuit 48 and directly to the staircase generator, as many as 16 pulses may be required from the comparator before the staircase generator would be indexed by said counter.

It will be noted in referring to FIG. 2 that two additional lines are shown, one of which is entitled, "A/D Convert Initiate" and "From A/D Conversion Complete." These two lines going to an analog to digital conversion unit together with the AND gate 48, switch 50 and flip-flop 52 ideally adapt the present sampling system for use as an input unit to a computer. The specific purpose of the circuitry shown is to first allow the sampling system to have a reasonably stable output and then to hold the sampling system at a particular point until the analog to digital conversion is complete. This is effected in the following manner. It will be noted that the output from the counter 28 goes directly to the "To A/D Convert Initiate" line and is also utilized to reset the flip-flop 52 to disable the AND gate 48. This line causes the output of the vertical amplifier 30 as shown on FIG. 1 to be sampled by the A/D converter and initiates a conversion cycle which as will be appreciated requires a finite amount of time. It is for this reason that the flip-flop 52 is "reset." Upon a completion of the A/D conversion the flip-flop 52 is again "set" by the signal appearing on the "From A/D Conversion Complete" line. The "setting" of the flip-flop 52 again enables the AND circuit 48 and the counter 28 will again start counting pulses from the comparator to index said counter.

It will be noted that at the time the flip-flop 52 is reset, a number of cycles may be processed by the sampling system, however, this is immaterial as it is basically assumed that the incoming signal set is recurrent in nature, i.e., the individual signals are changing very little from cycle to cycle.

It may be further seen that by taking an output from the counter 28 each time the counter is indexed or produces an output pulse that this signal could easily be utilized to select only the last signal during a given sample period for display purposes, that is, this line could be used to unblank the oscilloscope beam or trace assuming, of course, that the beam is normally blanked out. Returning briefly again to FIG. 1 it will be noticed that an output from the staircase generator 16 is also applied to the horizontal amplifier 32 for the display oscilloscope. This is merely to advance the horizontal sweep or time base to the next horizontal location where it is desired to show the output pulses or dots from a subsequent time period or point along the time base of the input signal set. This procedure, however, is conventional and need not be described in greater detail. The output of the horizontal amplifier 32 shown going to the A/D converter might be used for certain timing information in said converter and, as such, forms no part of the present invention and will accordingly not be described in further detail.

It may be seen from the above description of the present invention and the detailed description of the illustrated embodiment that the circuitry proposed comprises an extremely convenient means for automatically varying the number of samples to be taken at a given point on a waveform with different values of dot weighting and in essence preprograms the sampling circuit to operate in a certain fashion depending upon the setting of said dot weighting control.

Utilizing the present invention with a more or less conventional sampling system has a number of readily discernable advantages. The system provides an ultimate output of increased accuracy since a greater number of samples may be taken at any given point whereby, especially with large changes of magnitude from the immediately preceding sampling position, the ultimate output of the sampling circuit will more closely approximate the instantaneous value of the incoming signal at said point. This system further provides an extremely convenient method for delivering waveform data to data processing equipment such as A/D converters. Finally, the proposed additional changes over a more or less conventional sampling system such as a sampling oscilloscope are relatively inexpensive and simple to install and yet greatly increases the versatility and usefulness of such equipment.

While the invention has been particularly shown and described with reference to preferred embodiments thereof, it will be understood by those skilled in the art that various changes in form and details may be made therein without departing from the spirit and scope of the invention.

What is claimed is:

1. In a signal sampling system for sampling an input signal set wherein the individual signals of said set are substantially identical said system including:
   means for selectively sampling different points along the time base, of said input signals and for producing output signals proportional to the signal magnitude at said sampled points,
   means for applying said output signals to utilization means, said sampling means including
   timing means for repetitively sampling a given point along the time base of an incoming signal set a predetermined number of times before proceeding to and sampling the next point along said time base.

2. A sampling system as set forth in claim 1 said sampling means including gain control means for selectively varying the overall system gain.

3. A sampling system as set forth in claim 2 including:
   means for varying the number of samples taken at each said point along the time base of the incoming signal set.

4. A sampling system as set forth in claim 3 wherein said last named means includes a variable counter means having input means for selecting the number of input pulses which said counter must receive before an output pulse will be produced.

5. A sampling system as set forth in claim 4 including means for advancing the counter by sampling pulses produced by said timing means.

6. A sampling system as set forth in claim 5 wherein the gain control means comprises a variable dot weighting control.

7. A sampling system as set forth in claim 6 including means responsive to the instantaneous setting of said dot weighting control means to vary the input setting of said counter means.

8. A sampling system as set forth in claim 7 wherein said utilization means includes analog to digital conversion means connected to the output of said sampling system said conversion means normally requiring more than the pulse duration of an individual member of the incoming signal set to function,
    means for causing the output signals from the sampling system to be applied to said analog to digital conversion means and
    means for concurrently inhibiting advancement of said counter until said conversion means completes its function.

9. A sampling system as set forth in claim 8 including means for transmitting the output from the sampling system to the utilization means only after the last sample during a given sampling period has been taken.

10. A sampling system as set forth in claim 9 wherein said last named means includes means connected to the output of said counter whereby the output from said sampling system is fed to said utilization means only upon the occurrence of an output pulse from said counter.

11. A sampling system for sampling a recurrent input signal set said system including:
    sampling circuit means for repetitively sampling said input signals at a predetermined point along their time base,
    timing means for synchronizing said sampling circuit means with said input signals,
    fast ramp generating means,
    staircase generating means,
    comparator means connected to the outputs of said fast ramp and staircase generating means comparator means for producing an output pulse when the value of said fast ramp output equals the current output of said staircase generating means,
    strobe generator means for applying an activating pulse to said sampling circuit means in response to an output from said comparator means,
    variable counter means having an output connected to advance the staircase generator means, and having input means for receiving activating pulses,
    counter control means for selecting a desired input setting of said counter and for applying pulses from said comparator means to advance said counter means, and
    means for applying the output of said sampling circuit means to utilization means.

12. A sampling system as set forth in claim 11 including dot weighting control means for varying the dot weighting of said sampling circuit.

13. A sampling system as set forth in claim 12 wherein the means for varying the dot weighting comprises a variable alternation network.

14. A sampling system as set forth in claim 12 including interconnection means between said dot weighting control and said counter control including means for changing the counter input setting in response to changes of said dot weighting control.

15. A sampling system as set forth in claim 14 said system including means responsive to an output pulse from said counter for applying the output of said sampling circuit to said utilization means concurrently therewith.

16. A sampling system as set forth in claim 15 wherein said counter control means includes means for preventing further incrementing of said counter means after an output therefrom until said utilization means applies an activating signal thereto.

References Cited

UNITED STATES PATENTS

| | | | |
|---|---|---|---|
| 2,783,436 | 2/1957 | Gray et al. | 328—151 |
| 3,010,071 | 11/1961 | Carlson | 328—186 |
| 3,317,743 | 2/1967 | Rogers | 328—186 |
| 3,406,313 | 10/1968 | Lefevre et al. | 315—22 |

ARTHUR GAUSS, Primary Examiner

H. A. DIXON, Assistant Examiner

U.S. Cl. X.R.

328—186; 315—22